United States Patent [19]

Allo et al.

[11] Patent Number: 4,572,287
[45] Date of Patent: Feb. 25, 1986

[54] FALLING FILM HEAT EXCHANGER WITH FILM FORMING MEMBERS

[75] Inventors: Vincent F. Allo, Warrenville; Donald C. Stafford, Hinsdale, both of Ill.

[73] Assignee: Chicago Bridge & Iron Company, Oak Brook, Ill.

[21] Appl. No.: 604,149

[22] Filed: Apr. 26, 1984

Related U.S. Application Data

[63] Continuation-in-part of Ser. No. 481,829, Apr. 4, 1983, abandoned.

[51] Int. Cl.⁴ .................................................. F28D 3/02
[52] U.S. Cl. ........................... 165/118; 159/13.1; 165/115; 239/590.3; 261/153
[58] Field of Search ............... 165/174, 115, 118, 116; 203/90; 202/236; 159/13 A, 3; 261/153; 239/37, 590.3, 553.3; 137/561 R, 561 A, 846

[56] References Cited

U.S. PATENT DOCUMENTS

| | | | |
|---|---|---|---|
| 1,522,366 | 1/1925 | Hiller | 159/13 A |
| 1,557,838 | 10/1925 | Hiller | 159/13 A |
| 1,694,370 | 12/1928 | Burdick | 165/118 |
| 1,705,546 | 3/1929 | Shipley | 165/174 |
| 1,778,959 | 10/1930 | Peterson | 159/3 |
| 2,220,831 | 3/1937 | Swart | 137/262 |
| 2,973,230 | 2/1961 | Eastburg | 137/846 |
| 3,016,067 | 1/1962 | Edmonds | 165/174 |
| 3,060,882 | 10/1962 | Peiters | 137/846 |
| 3,997,408 | 12/1976 | Barba | 159/13 A |
| 4,094,734 | 6/1978 | Henderson | 202/236 |
| 4,286,436 | 9/1981 | Engdahal | 62/123 |
| 4,335,581 | 6/1982 | Nail | 62/123 |

FOREIGN PATENT DOCUMENTS 1242572  6/1967  Fed. Rep. of Germany ...... 137/262

OTHER PUBLICATIONS

Sack, M., "Falling Film Shell-and-Tube Heat Exchangers", Chemical Engineering progress, vol. 63, No. 7 (Jul. 1967), pp. 55-61.

Primary Examiner—William R. Cline
Assistant Examiner—Randolph A. Smith
Attorney, Agent, or Firm—Marshall, O'Toole, Gerstein, Murray & Bicknell

[57] ABSTRACT

This invention relates to shell and tube vertical falling film heat exchangers. More particularly, this invention is concerned with an improved heat exchanger which has an insert or cap on the upper ends of the tubes to direct the liquid against the inner surfaces of the tubes to form a thin falling film, thereby increasing heat exchange.

5 Claims, 6 Drawing Figures

FALLING FILM HEAT EXCHANGER WITH FILM FORMING MEMBERS

This application is a continuation-in-part of application Ser. No. 481,829, filed Apr. 4, 1983, now abandoned.

BACKGROUND OF THE INVENTION

Shell and tube falling film heat exchangers have an array of tubes extending between and through two spaced apart tube sheets surrounded by a shell. The shell is provided with an inlet and an outlet so that a suitable heat exchange liquid or gas can be circulated through the shell to cool or heat a liquid flowing through each tube.

Each end of the array of tubes can be left open, or exposed, for use in some processing operations. For other operations, one or both ends can be enclosed by a liquid retaining header, which may or may not have a removable cover or access port.

Although shell and tube heat exchangers are generally used to heat a liquid feed stream, they can be used for cooling such a stream. Shell and tube heat exchangers of the described types can be used as freeze exchangers for producing fresh water from brackish water and seawater, for concentrating fruit and vegetable juices, and industrial crystallization processes. As the liquid flows through each tube, it can be cooled enough to crystallize a solid from the liquid. Thus, by cooling seawater, ice is obtained which when separated, washed and melted provides potable water. When a fruit or vegetable juice is similarly chilled, ice forms and is removed to provide a concentrated juice.

Freeze exchangers of the described type can use any cooling fluid on the shell side to cool a liquid flowing downwardly through the tubes. The fluid can be fed through one end and removed through the other end of the freeze exchanger in a substantially unidirectional flow. Some suitable cooling fluids are refrigerant gases such as ammonia and Freon brand refrigerants.

Whether the heat exchanger is used to heat or cool a process liquid, it is desirable to be able to control the thickness and uniformity of the falling film in each tube. Generally, acceptable results are not obtained by simply supplying enough liquid to flow down such tube because the feed to each tube is most often nonuniform, with some tubes receiving much more, and others much less, liquid than desired for optimum heat exchange results. There is a need, accordingly, for apparatus which will facilitate supplying the process liquid to the tubes to produce falling films uniformly thick and evenly distributed on the internal surface of each tube.

SUMMARY OF THE INVENTION

A falling film heat exchanger comprising a shell connected to vertically spaced apart horizontally arranged circular upper and lower tube sheets; a plurality of vertically positioned parallel tubes, with each tube extending through and connected to a hole in each tube sheet; means to feed a heat exchange fluid to the shell side of the heat exchanger and means to withdraw the heat exchange fluid from the shell side of the heat exchanger; a liquid distribution box positioned above the upper tube sheet and means to deliver a feed liquid to the liquid distribution box; and a member in the upper end of each tube having means which directs liquid, flowing from the distribution box, against the tube internal wall and permits flow of liquid to the tube only through said member.

The member which directs liquid to the tube internal wall desirably includes a plurality of spaced apart holes which are sized so that the downwardly flowing liquid spreads out and distributes as a continuous liquid layer flowing downwardly on the tube internal wall.

More specifically, the member desirably directs the liquid at an angle of about 0° to 80° against the tube inner surface when measured from a plane horizontal to the tube axis. More specifically, the angle could be about 20° to 80°, with 40° to 70° presently believed optimum.

The member can be a space-surrounding short tube closed at the lower end except for means, such as holes, to direct the liquid to the tube internal wall.

The member can also be in the form of a space-surrounding cap on the tube end, said cap having a concave central portion with radial holes therein through which liquid can flow into contact with the tube internal wall. The cap can have a downwardly depending circular cylindrical skirt portion which fits around the tube upper end. Alternatively, the skirt portion can fit against the inner surface of the tube upper end.

DETAILED DESCRIPTION OF THE DRAWINGS

To the extent it is reasonable and practical, the same elements or parts in the various views of the drawings will be identified by the same numbers.

Figure 1:
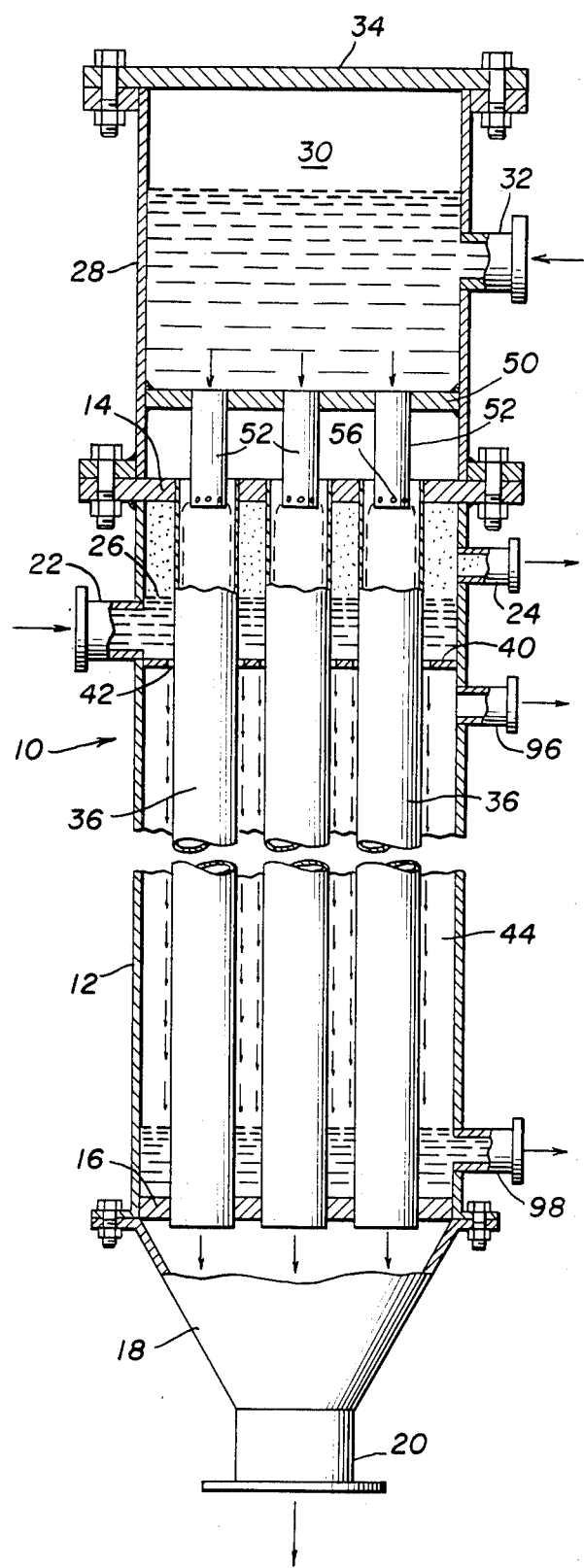
FIG. 1 is an elevational view, partially in section and partially broken away, of a heat exchanger according to the invention.

With reference to FIG. 1, the heat exchanger 10 has a vertical cylindrical circular metal shell 12 which is joined to upper tube sheet 14 and lower tube sheet 16. A conical end 18, connected to the lower end of shell 12, is provided with an exit port 20 through which liquid is removed from the tube side of the heat exchanger 10.

Extending upwardly from the edge of upper tube sheet 14 is a wall extension 28 of shell 12 which defines a distribution box surrounding space 30. Inlet port 32 communicates with an opening in wall 28 and provides a means for delivering an aqueous feed liquid to space 30. Removable cover 34 is positioned on top of wall 28.

Each one of a plurality of vertically positioned parallel circular heat exchange tubes 36 extends through and is joined to vertically aligned holes in the upper tube sheet 14 and lower tube sheet 16.

A liquefied refrigerant gas can be fed to the shell side of the freeze exchanger 10 through port 22. Refrigerant vapor is removed through upper port 24 which is located partially or wholly above the refrigerant liquid level 26. Plate 40 is positioned on shell 12 beneath refrigerant inlet 22. The plate 40 contains oversized holes 42 through which heat exchange tubes 36 extend. Because holes 42 are oversized, a ring-like opening is produced around each tube 36 through which refrigerant liquid flows downwardly and wets the exterior surface of the respective tube. The size of the oversized holes is dimensioned to produce a film of liquid refrigerant that flows down the outside of the tube. Some of the liquid is converted into a vapor which is exhausted through nozzle 96. The remaining liquid collects at the bottom of the heat exchanger and is removed through nozzle 98. Nozzle 24 is used to remove excess vapor/liquid from above the distribution plate 42.

The above is a description of a vertical falling film refrigerant on the outside of a tube combined with a vertical falling film slurry on the inside of a tube. A falling film on the inside of the tube could be combined with pool boiling or other systems on the shell side.

Figure 2:
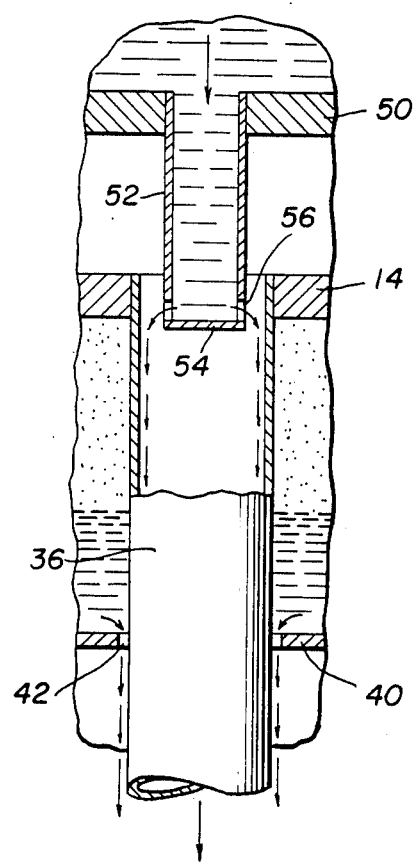
FIG. 2 is an enlarged elevational view, partially in section, of a liquid feed distribution tube projecting into the upper end of a heat exchange tube as also shown in FIG. 1.

The plate 50 constitutes the bottom of the distribution box. It contains a plurality of holes from which distribution tubes 52 depend downwardly in axial alignment with tubes 36. Tubes 52 have a smaller exterior diameter than heat exchange tubes 36. This permits the lower ends of tubes 52 to extend into the upper ends of tubes 36. The lower end of each distribution tube 52 is closed by a plate 54. A plurality of radially positioned horizontal holes 56 (FIGS. 1 and 2) are located in the lower end of each distribution tube 52. Each tube 52 is made of solid material. Each hole, and thus the hole wall or surface, extends through the tube solid material for the full thickness of the wall of the tube 52. The holes 56 permit the feed liquid in space 30 to flow out the holes 56 in horizontal full flow discrete liquid streams against the interior surface of tube 36. The streams are shaped, formed and aimed only by the holes in the distribution tube 52. As the multiplicity of discrete liquid streams flow downwardly they spread out quickly to form a continuous circumferential layer or film on the tube surface so as to provide the maximum surface area for heat exchange with the refrigerant on the shell side of the tubes 36.

The number and size of holes 56 placed in each distribution tube 52 will be selected so as to achieve the desired continuous film on tubes 36. When water is the feed liquid and tubes 36 are about two inches in diameter about ten to sixteen holes 36 can be used in each tube 52 and the holes can be about 0.05 to 0.15 inch in diameter. Thus, the internal surface walls of the holes extend for the full thickness of the wall of the tube 52. It should also be understood that the rate of flow through the holes can be regulated by the depth of feed liquid in space 30 as well as the pressure therein.

Figure 3:
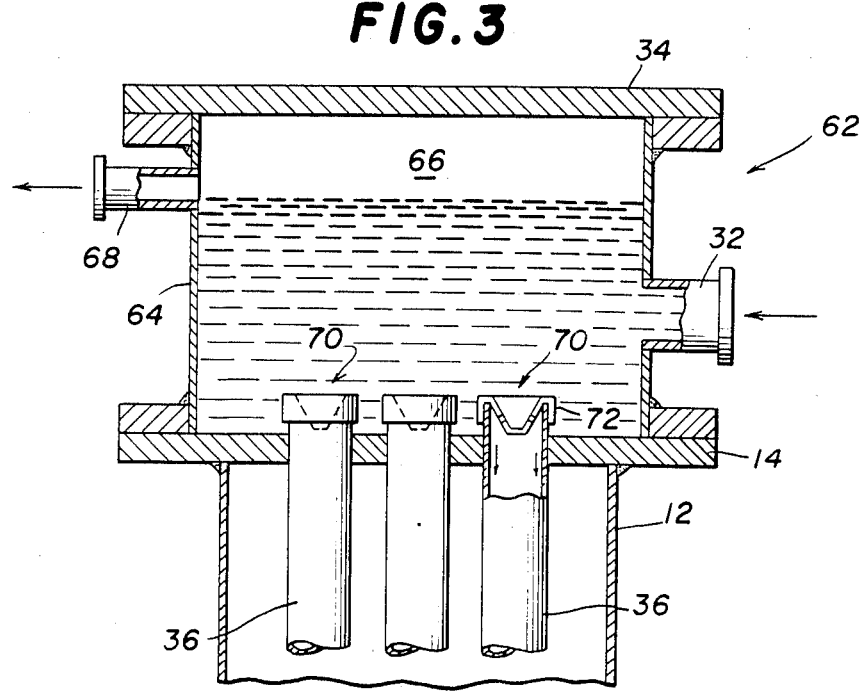
FIG. 3 is an elevational view, partially in section and partially broken away, of the upper portion of a heat exchanger showing a liquid distribution cap with a skirt outside the upper end of the heat exchange tubes.
Figure 4:
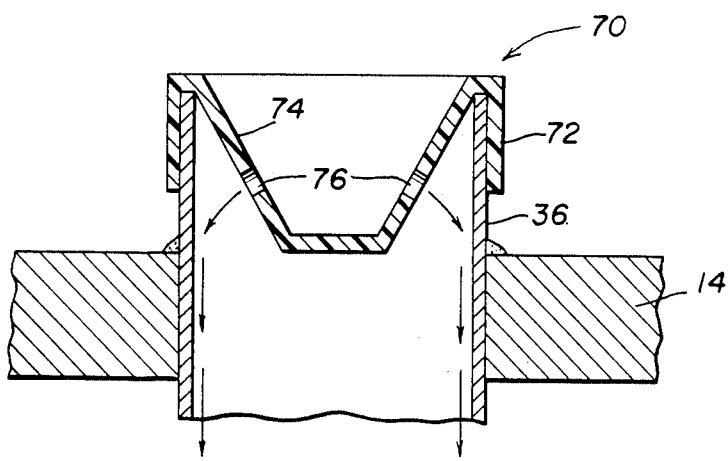
FIG. 4 is an enlarged view of the liquid distribution cap shown in FIG. 3.

FIGS. 3 and 4 illustrate a further embodiment of the invention. A plurality of heat exchange tubes 36 are positioned in shell 12. The upper ends of heat exchange tubes 36 pass through and are joined to upper tube sheet 14. Distribution box 62 is located above tube sheet 14. The distribution box 62 is defined by vertical circular cylindrical wall 64, removable cover 34 and tube sheet 14, and it surrounds space 66. Feed liquid is supplied through inlet port 32 and overflow feed liquid is removed through outlet 68. By this arrangement a constant liquid head is maintained in the feed box so as to regulate flow of feed liquid into the heat exchange tubes 36.

Mounted on the top of each heat exchange tube 36 is a feed liquid distribution cap 70 made of solid material (FIGS. 3 and 4). Each cap 70 has a circular skirt 72, which surrounds the top of a tube 36, and a downwardly directed space surrounding truncated conical shell portion 74 which fits into the upper end of tube 36. A plurality of radially positioned equally spaced apart holes 76 are positioned in portion 74 so as to direct feed liquid against the interior surface of tubes 36. The holes 76 are at an angle of about 35° measured downwardly from a line horizontal to the heat exchange tube axis. The holes 76 have wall surfaces extending for the full thickness of the cap body where they extend through the cap solid material. Liquid flows through the holes in full fluid flow, directly from the distribution box to the tube internal wall as a multiplicity of discrete liquid streams which are shaped, formed and aimed only by the holes in the cap body.

Figure 5:
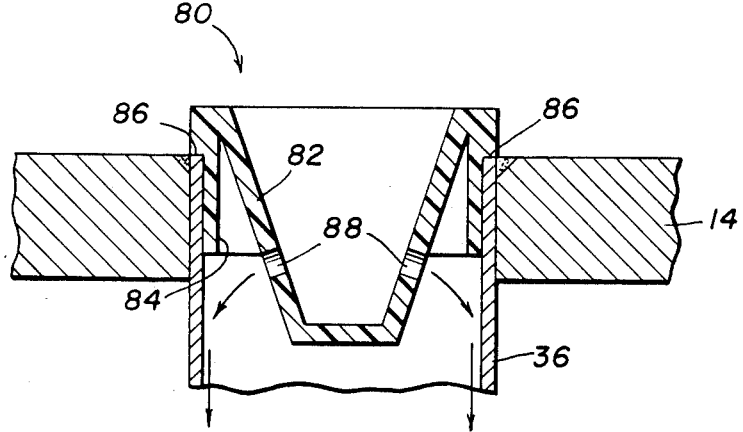
FIG. 5 is a sectional view of an alternative liquid feed distribution cap with a skirt fitting inside the heat exchange tube upper end.

Another distribution cap embodiment of the invention is shown in FIG. 5. In this embodiment, which is similar to that shown in FIGS. 3 and 4, the distribution cap 80 has a space-surrounding truncated conical shell portion 82 which is joined at its upper circumferential edge to a downwardly extending skirt 84 which has a ledge 86 which rests on the top edge of tube 36. Even though the skirt 84 fits into the upper end of tube 36, the ledge 86 prevents the cap from moving completely into the tube. A plurality of holes 88 are radially located in portion 82 and they direct feed liquid against the interior of tube 36 to completely wet the circumferential surface as the streams from the holes spread out as they flow downwardly clinging to that surface.

Figure 6:
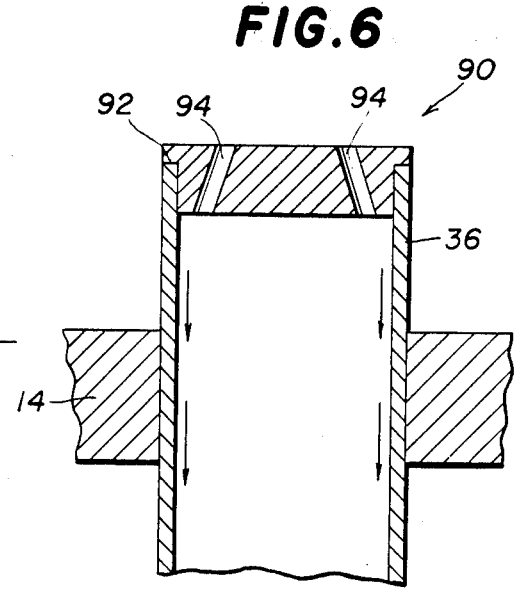
FIG. 6 is a vertical sectional view of a disc shaped liquid feed distribution cap on the upper end of a heat exchange tube.

A further distribution cap 90 embodiment is illustrated by FIG. 6. The cap 90 is essentially a disc with flat parallel opposing sides. Ledge 92 on the upper periphery of the cap 90 permits it to be mounted on the upper end of tube 36 without being displaced completely into the tube. The cap 90 contains a plurality of radially and downwardly spaced apart holes 94 which direct streams of feed liquid against the interior surface of tube 36. The holes 94 are positioned to be at a downward angle of about 70° from a line horizontal to the heat exchange tube axis.

Although the invention can be used in heating or cooling a feed liquid, it is especially useful when the heat exchanger is a freeze exchanger, such as in the production of potable water from salt water or brackish water. Since ice floats, any ice in recycled feed liquid will accumulate in the upper part of the liquid in the distribution box. The ice can be withdrawn with excess feed, as by use of the structure of FIG. 3. In this way, minimum ice is carried with the feed liquid through the holes in the distribution caps, thereby minimizing problems with the holes.

Although the holes in the distribution caps illustrated by the drawings are circular in lateral section, they can be square, triangular, rectangular or oval in section. Furthermore, the holes need not be in the same plane as the axis of tubes 36. The holes can be slanted in the same or opposing directions to obtain a helical flow as the streams hit the surface of tubes 36 to thereby enhance spreading to more quickly form a circumferential film.

The distribution caps and tubes can be made of any appropriate material. When used in a freeze exchanger they can be made of metal or a polymeric material.

Also, they can be machined or molded to the desired size and shape.

The use of a falling film instead of full flow feed liquid through tubes 36 results in a saving in pump horsepower since less liquid needs to be pumped because there is a more efficient heat exchange. By means of the described liquid distribution means, the falling film flow rate can be readily adjusted according to the liquid being processed by replacing the distribution means with others of the same type but different sized and number of holes. Of course, the feed liquid head and pressure in the distribution box can also be varied to increase or decrease the rate of flow through the heat exchange tubes.

The described system is characterized by elements which are readily fabricated, comparatively low cost and which use state of the art materials and construction procedures.

The foregoing detailed description has been given for clearness of understanding only, and no unnecessary limitations should be understood therefrom, as modifications will be obvious to those skilled in the art.

What is claimed is:

1. A falling film heat exchanger comprising:
 a shell connected to vertically spaced apart horizontally arranged circular upper and lower tube sheets;
 a plurality of vertically positioned parallel circular cylindrical tubes, with each tube extending through and connected to a hole in each tube sheet;
 means to feed a heat exchange fluid to the shell side of the heat exchanger and means to withdraw the heat exchange fluid from the shell side of the heat exchanger;
 on the upper end of each tube, a cap comprising a cap body having a cap central axis coincident to a central axis of each tube;
 the cap body including a central shell portion concave in an axial direction when viewed from the top of the cap;
 the cap body being solid material except for a plurality of spaced apart holes extending through said cap body central shell portion in a radially downward direction and with the holes providing the only access to the tube interior;
 said holes having wall surfaces extending for the full thickness of the cap body where they extend through the cap solid material so that liquid is supplied, in full liquid flow through the holes, directly from the distribution box to the tube internal wall as a multiplicity of discrete liquid streams which are shaped, formed and aimed only by the holes in the cap body.

2. A falling film heat exchanger according to claim 1 in which each hole is substantially perpendicular to the shell portion where the hole extends through the shell portion.

3. A falling film heat exchanger according to claim 1 in which the concave central shell portion has a circular flat central bottom from which a truncated conical shell extends upwardly, and the holes are in the truncated conical shell.

4. A falling film heat exchanger according to claim 1 in which the cap has a downwardly depending circular cylindrical skirt portion which fits around the tube upper end.

5. A falling film heat exchanger according to claim 1 in which the cap has a downwardly depending circular cylindrical skirt portion which fits against the inner surface of the tube upper end.

* * * * *

UNITED STATES PATENT AND TRADEMARK OFFICE
CERTIFICATE OF CORRECTION

PATENT NO. : 4,572,287
DATED : February 25, 1986
INVENTOR(S) : VINCENT F. ALLO ET AL It is certified that error appears in the above-identified patent and that said Letters Patent is hereby corrected as shown below:

In the Abstract, line 3, change "concered" to -- concerned --;

column 1, line 5, after "of" insert -- our --; after line 7, insert the following as a paragraph -- This invention relates to shell and tube vertical falling film heat exchangers. More particularly, this invention is concerned with an improved heat exchanger which has an insert or cap on the upper ends of the tubes to direct the liquid against the inner surfaces of the tubes to form a thin falling film, thereby increasing heat exchange. --

Signed and Sealed this

Third Day of June 1986

[SEAL]

Attest:

DONALD J. QUIGG

Attesting Officer

Commissioner of Patents and Trademarks